US006162164A

United States Patent [19]

Lorraine et al.

[11] Patent Number: 6,162,164

[45] Date of Patent: Dec. 19, 2000

[54] PROCESS OF RECYCLING A LIQUID WASTE

[76] Inventors: Segala Lorraine; David Long, both of 1812 Conejo La., Fullerton, Calif. 92833-1810

[21] Appl. No.: 09/151,716

[22] Filed: Sep. 11, 1998

[51] Int. Cl.[7] ........................ A62D 3/00

[52] U.S. Cl. ........................ 588/257; 588/252; 405/129

[58] Field of Search ........................ 588/249, 252, 588/255, 256, 257; 405/128, 129

[56] References Cited

U.S. PATENT DOCUMENTS

| | | | |
|---|---|---|---|
| 4,432,666 | 2/1984 | Frey et al. | 588/257 |
| 4,731,120 | 3/1988 | Tuutti | 588/256 |
| 4,744,829 | 5/1988 | Eirich et al. | 588/256 |
| 5,346,549 | 9/1994 | Johnson | 588/257 |
| 5,376,156 | 12/1994 | Schraufstetter et al. | 588/255 |
| 5,496,404 | 3/1996 | Price et al. | 106/407 |
| 5,550,314 | 8/1996 | Laughlin et al. | 588/256 |
| 5,562,590 | 10/1996 | Caza | 588/257 |
| 5,573,587 | 11/1996 | St. Louis | 588/256 |

*Primary Examiner*—Eileen D. Lillis
*Assistant Examiner*—Frederick L. Lagman
*Attorney, Agent, or Firm*—Fish & Associates, LLP.; Robert D. Fish

[57] ABSTRACT

Recycling liquid waste and rendering particulate substances suitable for handling, transportation, or use. More specifically, preferred embodiments provide methods for recycling waste liquids such as latex paint by using them as an agglomeration agent to increase the particle size for particulate substances such as ash, dust, powders, sands, sludge, and fines.

3 Claims, 1 Drawing Sheet

10

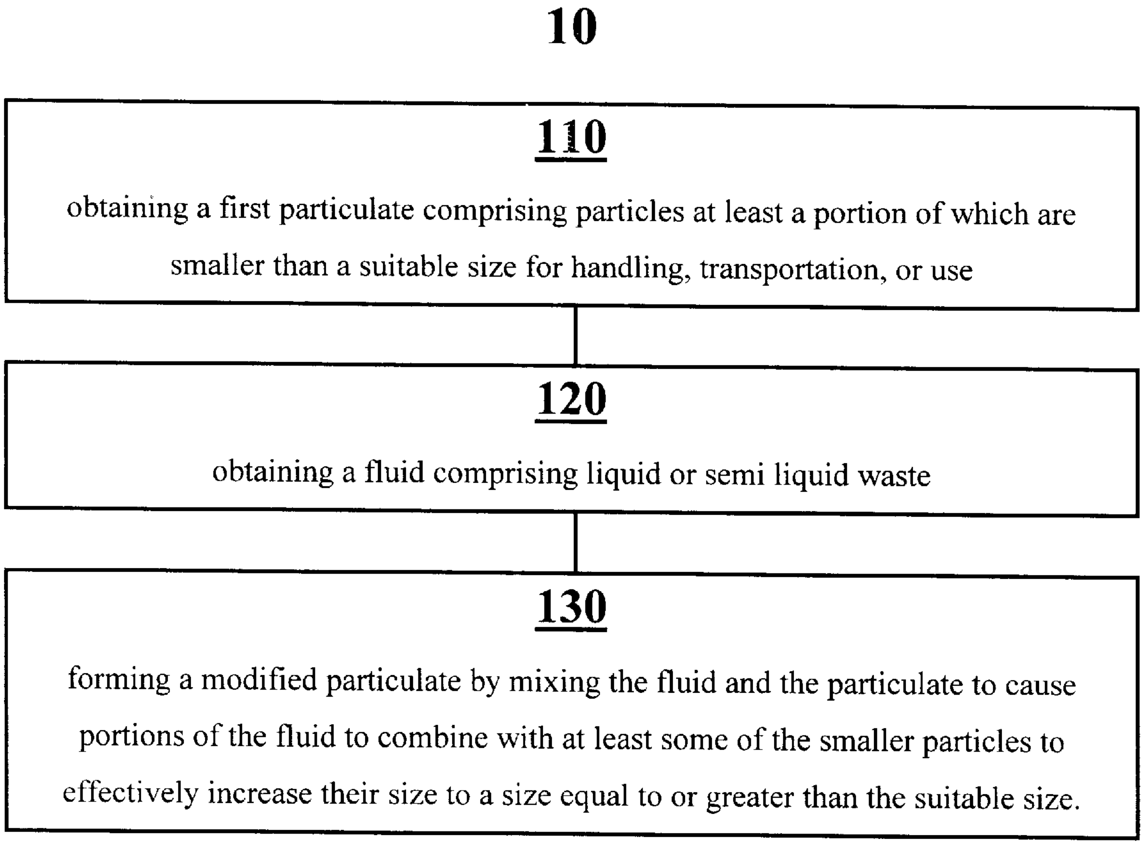

110 obtaining a first particulate comprising particles at least a portion of which are smaller than a suitable size for handling, transportation, or use

120 obtaining a fluid comprising liquid or semi liquid waste

130 forming a modified particulate by mixing the fluid and the particulate to cause portions of the fluid to combine with at least some of the smaller particles to effectively increase their size to a size equal to or greater than the su

PROCESS OF RECYCLING A LIQUID WASTE

FIELD OF THE INVENTION

The field of the invention is the recycling of liquid waste and particle agglomeration.

BACKGROUND OF THE INVENTION

Considerable resources have been invested over the years in finding ways to utilize "waste" materials. Thus, large amounts of materials such as glass, paper, and aluminum which would likely have ended up in a land fill in past years, are now likely to be re-used in the manufacture of new products.

Utilizing particulate waste materials comprising small particles (sometimes hereinafter simply "particulates") tends to be especially problematic. The small size of the particles of a particulate may make it impossible or impractical to transport the particulate and/or use the particulate. Examples having such small particles include fly or bottom ash generated from combustion of fuels in power generation, heating plants, and industrial boilers; paper mill sludge generated by paper production; cement kiln dust generated by the manufacture of cement; iron and steel fines from steel mills; and dust and other particulates originating from unpaved roads.

Finely divided particulates may also pose a serious risk to the environment and the health of people and animals. Inhalation of such particulates may cause suffocation or injury. Such particulates may create a risk of explosion. When being transported, particulates escaping from a carrier vehicle may be a risk to nearby vehicles or property. If found on the surface of a road, finely divided particulates in the form of dust can reduce traction and decrease visibility.

One method for utilizing particulate waste materials involves using agglomeration agents to increase particle sizes to usable diameters. A variety of materials are currently used as agglomeration agents including liquid silicates, starches, adhesives, and hydraulic cements. Agglomeration might be accomplished by agglutination, flocculation, chemical binding, and/or adhesion.

Although agglomeration of particles is known, the use of known agglomeration agents may be unsatisfactory for a number of reasons. One reason is that the agglomeration agent itself comprises materials to be conserved. Another is that it may be economically impractical to utilize known agglomeration agents. The agent itself may be too expensive, or have too much utility elsewhere, to justify its use as an agglomeration agent. Thus there is a continuing need to identify new agglomeration agents.

Some waste materials, in addition to having no known utility, are difficult to dispose of. Such materials include leftover surface coatings such as paints from painting and construction. As an example, latex paint waste is increasingly being prohibited from landfills due to restrictions on disposal of liquid wastes.

In general, even for other materials than those previously described, disposal in land fills is undesirable due to the limited capacity of existing land fills and the risk posed in maintaining land fills. Thus, there is a continuing need to find ways to dispose of waste materials other than by dumping them in a land fill.

SUMMARY OF THE INVENTION

The present invention is directed to recycling liquid waste and rendering particulate substances suitable for handling, transportation, or use. More specifically, preferred embodiments provide methods for recycling waste liquids such as latex paint by using them as an agglomeration agent to increase the particle size for particulate substances such as ash, dust, powders, sands, sludge, and fines.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 1 is a block diagram of a first method embodying the invention.

DETAILED DESCRIPTION

Referring first to FIG. 1, a process 10 for recycling liquid waste and rendering particulate substances suitable for handling, transportation, or use comprises (1) the step 110 of obtaining a first particulate comprising particles at least a portion of which are smaller than a suitable size for handling, transportation, or use; (2) the step 120 of obtaining a fluid comprising liquid or semi liquid waste; and (3) the step 130 of forming a modified particulate by mixing the fluid and the particulate to cause portions of the fluid to combine with at least some of the smaller particles to effectively increase their size to a size equal to or greater than the suitable size.

As used herein, a suitable size for handling, transportation, or use is dependent on the particulate and/or the intended method of handling, transportation, or use. As an example, road dust on a road might be considered undesirable because of its tendency to be lifted off the surface of the road by the air currents generated by moving cars. Increasing the particle size to something larger, perhaps pea sized, so that air currents from moving cars no longer lift them off the surface of the road would improve the quality of the road surface. Another example may be the use of steel or iron fines which are too small to re-use in a manufacturing process. Increasing the size of the particles so that they can be reasonably transported for re-use would be the equivalent of effectively increasing their size to a size equal to or greater than the suitable size. Other examples may include a particulate which, if transported by an open truck would tend to blow off the truck, or if transported by conveyor belt might be blown off of the belt. Increasing the size of at least some of the particles of the particulate so that it would be feasible to transport the particles via truck or conveyor belt with little risk that they would be blown off of the truck or belt would be the equivalent of effectively increasing their size to a size equal to or greater than the suitable size. Thus, it is contemplated that a size suitable for handling, transportation, or use may include a large number of different values. Assuming that particle size can be measured by specifying the diameter of a sphere within which the particle would fit, suitable size values may fall within one or more of the following ranges: greater than or equal to (1) 1 mm; (2) 10 mm; or (3) 100 mm, and/or within 1–10 mm, 10–100 mm, or 100–500 mm.

Because the suitable size for handling, transportation, or use is dependent on the particulate and/or the intended method handling, it is contemplated one or more of the following steps may be added to process 10: (1) determining the size of at least some of the particles of the particulate; (2) determining the intended method of handling, transportation, or use; (3) determining whether the size of at least some of the particles renders the particulate unsuitable for an intended method of handling, transportation, or use; (4) determining whether the particulate is unsuitable because there is an unreasonably high risk of pollution if the particulate is handled, transported, or used in the intended manner; (5) determining whether the particulate is unsuitable because there is an unreasonably high risk to persons or property if the particulate is handled, transported, or used in the intended manner; (6) determining whether the particulate is unsuitable because there is an unreasonably high risk of loss of at least some of the particulate if the particulate is handled, transported, or used in the intended manner.

It is contemplated that the liquid or semi liquid waste of step 120 may comprise at least one of a paint, ink, surface coating, adhesive, resin, or starch. It is further contemplated that paint includes at least latex and water based paint; that ink includes at least latex and water based inks; that surface coating includes at least water miscible coatings, latex architectural coatings, and water soluble architectural coatings; that adhesive includes at least water soluble adhesives; and that starch includes at least water soluble starches.

It is also contemplated that the particulate of step 110 may comprise at least one of foundry sand, clay, ash, catalyst, iron powder, aluminum powder, coal piles, kiln dust, road dust, wood dust, limestone, ores, soils, fines, or paper mill sludge.

The mixing of the fluid and the particulate in step 130 may comprise spraying the fluid onto the particulate, scattering the particulate onto the fluid, combining the fluid and particulate and agitating the combination, or any other method suitable for mixing a fluid and a particulate.

Step 130 of forming modified particulate may comprise additional sub-steps such as (1) heating and/or cooling the particulate and/or fluid prior to or during mixing, or heating and/or cooling the resultant mixture; (2) grinding, crushing, chopping, or otherwise reducing the size of any pieces formed by the mixing process; or (3) chemically treating the fluid and/or particulate prior to or during mixing, or chemically treating the resultant mixture. Effectively increasing the size of particles may include causing multiple particles to adhere to each other, having quantities of the liquid waste adhere to individual particles, or a combination of liquid waste adhering to particles and particles adhering to each other.

It is contemplated that the method 10 will have particular utility in a number of applications. One such would be in dust treatment. As an example, the method 10 could be applied to cement kiln dust for general dust control and to reuse the dust as a feed product. The method 10 could also be used for dust on road surfaces, stockpiles, and conveyor belts. In addition to dust control on road surfaces, the method could be used to generally treat road surfaces to reduce air emissions, erosion, and to increase durability. Similarly, the method 10 could also be used for controlling dust and particulate air emissions generated during vehicle transport such as from open rail cars, trucks and trailers. In this application, only agglomeration of the exposed surface particulates may be required for control. This approach reduces particulate processing to a smaller percentage of the transported volume, and allows for application of the agglomerating agent after placement of the particulates into the transport vehicle/vessel.

In another application, the method 10 can be applied to fly ash waste from power generation to reduce inhalation hazards, to ease transportation, and for use in surface applications such as covering landfills. The method 10 can also be applied to coal or coke, especially prior to use in power generation, to reduce risk of fire or explosion, to reduce product loss, and reduce air emissions.

In yet another application, coal, coke, wood wastes and paper are common fuels for industrial furnaces, boilers and kilns, either as a direct fired fuel or in an indirect system that uses a heat exchange medium. An aspect of fuel efficiency in these situations is in controlling the fuel combustion zone. Typically this is accomplished by controlling fuel particle size and air introduction into the combustion zone. The problem in using finely divided particles as a significant percentage of furnace fuel demand may include: a) the rapid pass through of the fuel through the combustion zone due to excess air flow: and b) partial burning prior to entering the combustion zone due to the high surface area to mass ratio. Agglomeration or pelletizing of particulate fuel materials have long been recognized as an option. However, the cost of conventional agglomeration and pelleting technologies may be cost prohibitive, with the consequence that large volumes of these fuel particulates are being disposed in slurry impoundments or landfills. The use of method 10 in the process of agglomeration and pelleting may assist in reducing the cost to an acceptable level.

In yet another application, method 10 may be applied to allow the use of the agglomerated particulates as landfill cover. Recent environmental regulations at the national and state levels require that the open working areas of the landfill be covered with soils or other approved product. It is required that the fill areas are covered daily. Landfill cover is designed to minimize odors and the escape of gasses, prevent fires, and inhibit blowing litter. Particulate type soils or particulate wastes cannot be efficiently used due to handling and placement difficulties, their tendency to be dislodged with wind; and the chronic problem of shifting below the surface of refuse, thereby exposing trash. Applying method 10 to the agglomeration of these particulate soils and wastes allows for use in a manner similar to that of courser soils, dirt and sands.

In a derivation the application of method 10 to allow the use of agglomerated particulates as landfill cover, the fluid/agglomeration agent such as waste latex paint may be mixed with the particulates just prior to application to form a surface treatment that binds the particulate to the in place refuse. Another derivation is to allow the use of lighter weight geotextiles as cover material at landfills through application of the agglomeration agent directly to the underside of the geomembrane or onto the compacted surface of the landfill and then placing the geomembrane in direct contact with the agglomeration agent.

Method 10 may also be applied to mining operations. The extraction of precious metals from ores is frequently accomplished using cyanide leaching techniques. A cyanide solution is recirculated through a prepared ore pile, with the precious metals leached from the ore into the cyanide solution. A key to the efficacy of the extraction methodology is the uniformity in diameters of the piled ore rock. Excessive particulates bind off the cyanide circulation through the piles, reducing the recovery rates of the precious metals. Where the value of the ore justifies the cost, the finely divided ore particulates are collected and agglomerated to the proper diameters using hydraulic cement and/or quick lime. As an alternative, application of method 10 to agglomerate the ore particulates may decrease the amount Portland cement or quicklime used in agglomeration of ore particulates in a heap leach system.

Other applications include the reuse, transportation, storage, and/or disposal of steel and iron fines; the treatment of paper mill sludge; and in brick creation.

Thus, specific embodiments and applications of recycling liquid waste and rendering particulate substances suitable for handling, transportation, or use have been disclosed. It should be apparent, however, to those skilled in the art that many more modifications besides those already described are possible without departing from the inventive concepts herein. The inventive subject matter, therefore, is not to be restricted except in the spirit of the appended claims.

What is claimed is:

1. A process for recycling liquid waste and rendering particulate substances suitable for handling, transportation, or use:

obtaining a first particulate comprising particles at least a portion of which are smaller than a suitable size for handling, transportation, or use;

obtaining a fluid comprising liquid or semi liquid waste; and forming a modified particulate by mixing the fluid and the particulate to cause portions of the fluid to combine with at least some of the smaller particles to effectively increase their size to a size equal to or greater than the suitable size;

wherein the particulate comprises at least one of dirt, soil, stockpiles, foundry sand, clay, ash, catalyst, iron powder, aluminum powder, coal piles, kiln dust, road dust, wood dust, limestone, ores, soils, fines, or paper mill sludge, and the particulate is located on the surface of a road and the mixing is accomplished while the particulate remains on the surface of a the road.

2. A process for recycling liquid waste and improving the fuel efficiency of coal, coke, wood wastes and paper as fuels for industrial furnaces, boilers and kilns, either as a direct fired fuel or in an indirect system that uses a heat exchange medium, said furnaces, boilers and kilns including a combustion zone, the process comprising:

obtaining a first particulate to be used as a fuel, the particulate comprising at least one of: coal, coke, wood wastes and paper;

obtaining a fluid comprising liquid or semi liquid waste; and forming a modified particulate by mixing the fluid and the first particulate to cause portions of the fluid to combine with at least some of the particulate particles to effectively increase their size to a size large enough to decrease the rate at which excess air flow moves them through the combustion zone, or large enough to decrease the amount of partial burning occurring prior to entering the combustion zone.

3. A process for a recycling liquid waste and using geotextiles as cover material at a landfill having a compacted surface:

obtaining a fluid comprising liquid or semi liquid waste;

obtaining a geomembrane;

applying the liquid or semi liquid waste to the underside of the geomembrane or onto the compacted surface of the landfill and then placing the underside of the geomembrane in direct contact with the compacted surface of the landfill.

* * * * *

UNITED STATES PATENT AND TRADEMARK OFFICE
CERTIFICATE OF CORRECTION

PATENT NO : 6162164

DATED : December 19, 2000

INVENTOR(S) : Lorraine SEGALA and David LONG

It is certified that error appears in the above-identified patent and that said Letters Patent are hereby corrected as shown below:

On title page, item 76 Inventors
replace "Segala Lorraine"
with --Lorraine Segala--.

Signed and Sealed this

Twenty-ninth Day of May, 2001

*Attest:*

Nicholas P. Godici

NICHOLAS P. GODICI

*Attesting Officer*

*Acting Director of the United States Patent and Trademark Office*